United States Patent
Gonzalez (10) Patent No.: US 10,612,314 B2
(45) Date of Patent: Apr. 7, 2020

(54) GEARBOX GUIDE ASSEMBLY

(71) Applicant: Caterpillar Global Mining Equipment LLC, Denison, TX (US)

(72) Inventor: Fernando Rene Gonzalez Gonzalez, Sherman, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 380 days.

(21) Appl. No.: 15/605,035

(22) Filed: May 25, 2017

(65) Prior Publication Data

US 2018/0340376 A1 Nov. 29, 2018

(51) Int. Cl.
*E21B 15/00* (2006.01)
*F16H 57/025* (2012.01)
*E21B 3/02* (2006.01)
*E21B 7/02* (2006.01)

(52) U.S. Cl.
CPC .............. *E21B 15/00* (2013.01); *E21B 3/02* (2013.01); *E21B 7/02* (2013.01); *F16H 57/025* (2013.01)

(58) Field of Classification Search
CPC ... E21B 15/00; E21B 3/02; E21B 7/02; F16H 57/025
USPC .................. 173/28, 184, 188, 147, 192, 195
See application file for complete search history.

(56) References Cited

U.S. PATENT DOCUMENTS

| 3,460,638 | A | 8/1969 | Millsapps, Jr. | |
|---|---|---|---|---|
| 6,672,410 | B2 * | 1/2004 | Smith | E21B 19/084 |
| | | | | 175/122 |
| 7,584,810 | B1 * | 9/2009 | McKnight, Jr. | E21B 15/00 |
| | | | | 175/162 |
| 8,181,721 | B1 * | 5/2012 | Keast | E21B 19/02 |
| | | | | 175/162 |
| 2016/0145950 | A1 | 5/2016 | Bu et al. | |

FOREIGN PATENT DOCUMENTS

EP 1689967 8/2006
WO 2012140326 10/2012

* cited by examiner

*Primary Examiner* — Nathaniel C Chukwurah
(74) *Attorney, Agent, or Firm* — Hibshman Claim Construction PLLC (57) ABSTRACT

A gearbox guide assembly is provided. The guide assembly includes a guide plate. The guide assembly is configured to guide a movement of a gearbox along a mast of a machine. The gearbox guide assembly also includes a support assembly associated with the guide assembly. The support assembly is configured to couple to the mast. The support assembly is removably attachable to the guide assembly through mechanical fasteners. The support assembly includes a plurality of wear pad assemblies attached to the support assembly. Each of the plurality of wear pad assemblies includes a wear pad configured to contact the mast. Each of the plurality of wear pad assemblies also includes a key element removably coupled along one edge of the wear pad by mechanical fasteners. The wear pad is accessible for removal thereof by decoupling the key element associated therewith.

19 Claims, 7 Drawing Sheets

GEARBOX GUIDE ASSEMBLY

TECHNICAL FIELD

The present disclosure relates to a guide assembly, and more particularly to the guide assembly for a gearbox of a blast hole drill machine.

BACKGROUND

Machines such as blast hole drills are large machines used to drill holes for explosives in mining operations. A conventional blast hole drill comprises a frame supported by crawlers for movement over the ground, and a mast supported by the frame for movement between a substantially vertical position and a number of angled or non-vertical positions. A hydraulic gearbox is used to rotate a pipe of the machine to perform a drilling operation. The gearbox is capable of sliding along the mast. A guide structure is used to attach the gearbox to the mast. The guide structure includes wear pads provided thereon for preventing direct steel-to-steel contact between the guide structure and the mast, increasing time between service intervals and allowing smooth sliding of the gearbox.

In known guide structure designs the wear pads are bolted onto the guide structure in such a manner that it may be difficult to adjust the wear pads. The wear pads may need to be removed for replacement purposes or readjusted to maintain required contact with the mast on a regular basis. The current guide structures are designed such that a user's ability to access and adjust the wear pads is limited. Further, the guide structure may offer restricted space for removing the wear pad. Also, in some situations, the gearbox may need to be fully removed and dismantled from the mast in order to access the wear pads. This may be a time consuming, laborious, and inconvenient procedure affecting overall productivity of the system.

United States Published Application Number 2016/0145950 describes a rock drill telescopic arm having a fixed arm which is sleeved on a movable arm; a telescopic oil cylinder; a plurality of adjusting blocks in the fixed arm along a circumferential direction thereof; a plurality of adjusting screw rods for respectively adjusting the position of each of the adjusting blocks on the fixed arm; a wear-resistant sliding block between at least part of the adjusting blocks and the movable arm; and a retainer at an opening end of the fixed arm for preventing the wear-resistant sliding block from moving along a telescoping direction of the movable arm.

SUMMARY OF THE DISCLOSURE

In one aspect of the present disclosure, a gearbox guide assembly is provided. The guide assembly includes a guide plate. The guide assembly is configured to guide a movement of a gearbox along a mast of a machine. The gearbox guide assembly also includes a support assembly associated with the guide assembly. The support assembly is configured to couple to the mast. The support assembly is removably attachable to the guide assembly through mechanical fasteners. The support assembly includes a plurality of wear pad assemblies attached to the support assembly. Each of the plurality of wear pad assemblies includes a wear pad configured to contact the mast. Each of the plurality of wear pad assemblies also includes a key element removably coupled along one edge of the wear pad by mechanical fasteners. The wear pad is accessible for removal thereof by decoupling the key element associated therewith.

In another aspect of the present disclosure, a gearbox guide assembly is provided. The gearbox guide assembly includes a guide assembly including a guide plate. The guide assembly is configured to guide a movement of a gearbox along a mast of a machine. The gearbox guide assembly also includes a support assembly associated with the guide assembly. The support assembly is configured to couple to the mast. The support assembly is removably attachable to the guide assembly through mechanical fasteners. The support assembly includes a plurality of wear pad assemblies attached to the support assembly. Each of the plurality of wear pad assemblies includes a wear pad configured to contact the mast. Each of the plurality of wear pad assemblies also includes a support plate provided on an opposite side of the wear pad contacting the mast and a back plate contacting the support plate. The back plate defines a plurality of apertures for receiving mechanical fasteners therethrough. The support plate is configured to prevent direct contact between the mechanical fasteners of the back plate and the wear pad. A movement of the wear pad towards the mast is configured to be controlled by adjusting the mechanical fasteners associated with the back plate.

In yet another aspect of the present disclosure, a machine is provided. The machine includes an engine, a gearbox, a mast, and a gearbox guide assembly for the gearbox. The gearbox guide assembly includes a guide assembly including a guide plate. The guide assembly is configured to guide a movement of a gearbox along the mast. The gearbox guide assembly also includes a support assembly associated with the guide assembly. The support assembly is configured to couple to the mast. The support assembly is removably attachable to the guide assembly through mechanical fasteners. The support assembly includes a plurality of wear pad assemblies attached to the support assembly. Each of the plurality of wear pad assemblies includes a wear pad and a key element. The wear pad is configured to contact the mast. The key element is removably coupled along one edge of the wear pad by mechanical fasteners. The wear pad is accessible for removal thereof by decoupling the key element associated therewith.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
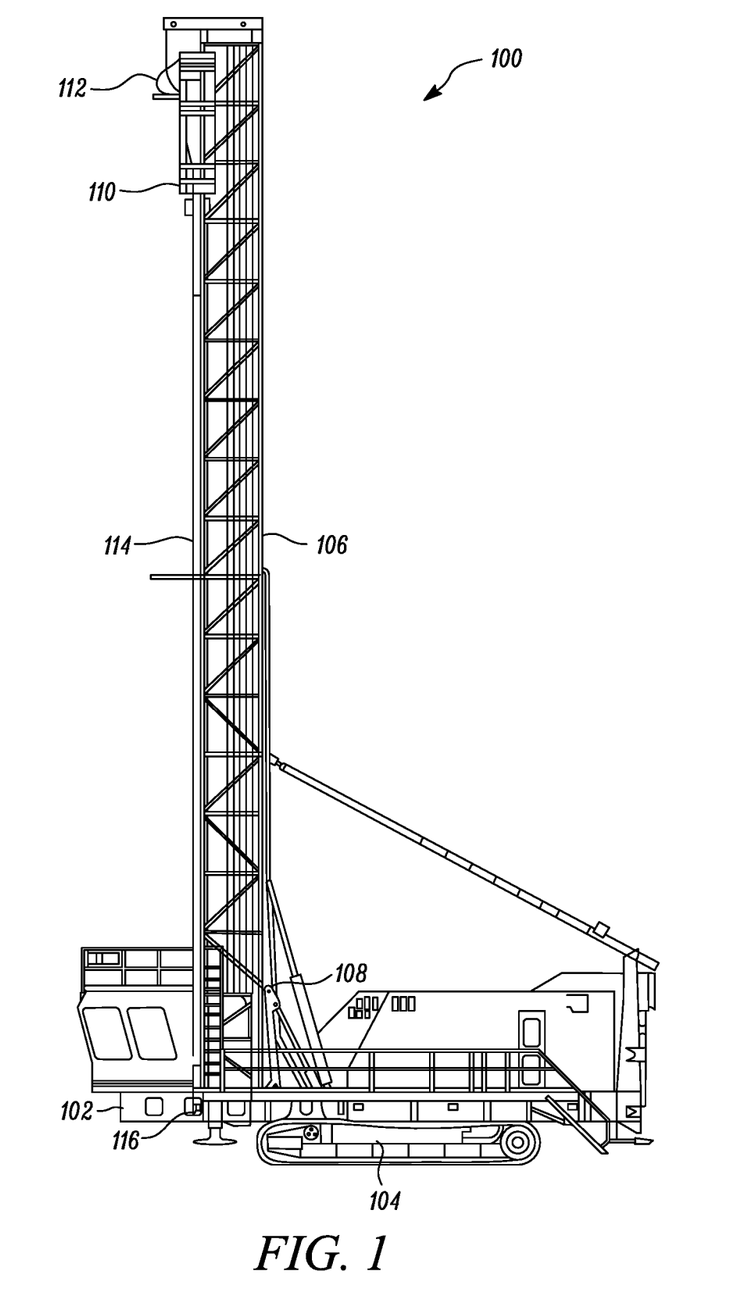
FIG. 1 is a side view of an exemplary machine, according to various concepts of the present disclosure.

Referring to FIG. 1, an exemplary machine 100 is illustrated. The machine is embodied as a blast hole drill. The machine 100 includes a main deck frame 102 supported on crawler tractors 104 and mounting a mast 106 supported on a pivot 108 attached to the deck frame 102. A rotary drill head 110 is mounted on a pull-down mechanism 112 on the mast 106. The pull-down mechanism 112 travels up and down side cords of the mast 106. The drill head 110 includes a rotary drive which engages with the top of a drill pipe string comprising drill pipes 114 to rotate a drill bit 116 on a first pipe in the drill pipe string. The drill head 110 is moved down the mast 106 to force the drill bit 116 into the earth and is moved up the mast 106 to withdraw the drill pipe string from the earth. A pipe magazine stores the pipes 114 added to the pipe string as the drill deepens the hole being drilled. The pipe magazine rests in the back of the mast 106 and swings over a centerline of the drill pipe string to add or remove the pipes 114 from the drill pipe string.

Figure 2:
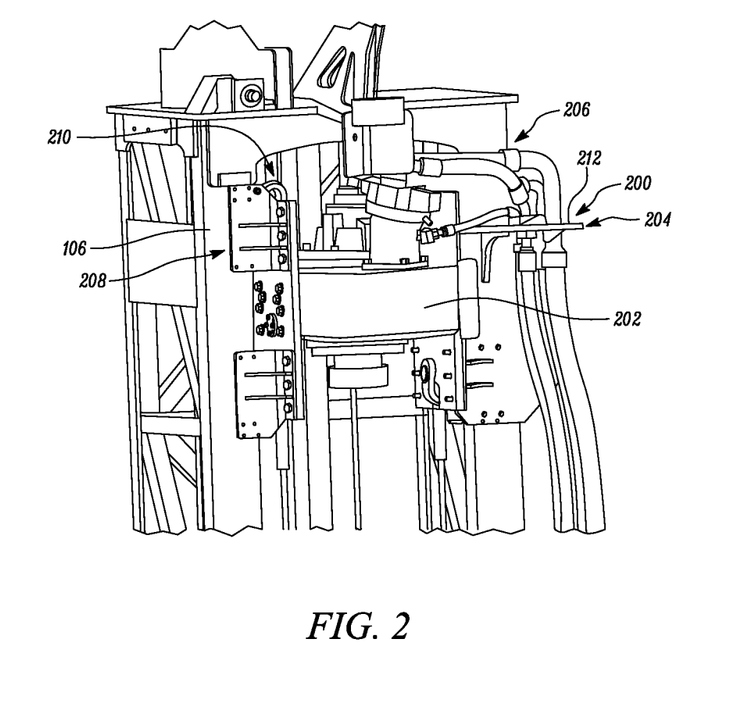
FIG. 2 is a perspective view of a gearbox mounted on a mast of the machine and a pair of gearbox guide assemblies, according to various concepts of the present disclosure.
Figure 3:
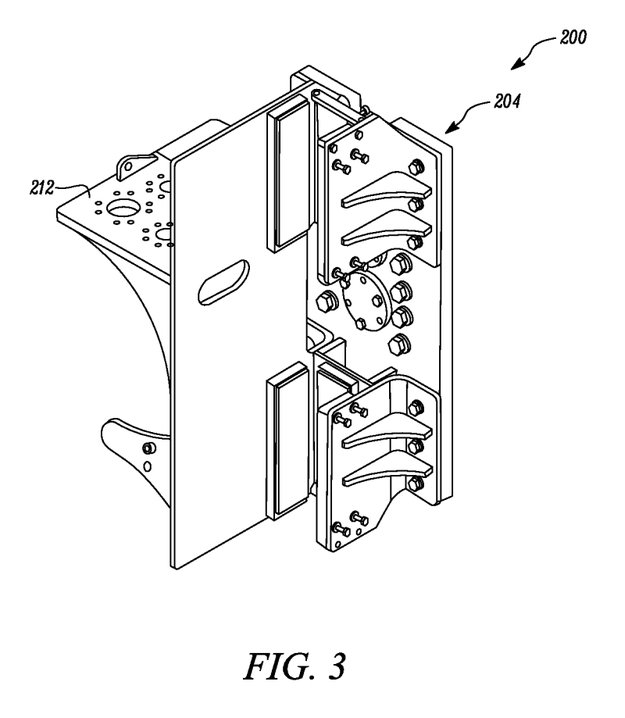
FIG. 3 is a perspective view of one gearbox guide assembly, according to various concepts of the present disclosure.

The present disclosure relates to a gearbox guide assembly 200 (see FIG. 2) associated with a gearbox 202 (see FIG. 2) of the machine 100. Referring to FIG. 2, the gearbox 202 is a hydraulic gearbox used to rotate the pipe and perform the drilling function. The gearbox 202 slides up and down of the mast 106. This gearbox 202 is attached to the mast 106 using the gearbox guide assembly 200 for holding the gearbox 202 in position in relation to the mast 106. One gearbox guide assembly 200 is provided on either sides of the gearbox 202. For example, a first gearbox guide assembly 204 is provided on a first side 206 of the gearbox 202 and a second gearbox guide assembly 208 is provided on a second side 210 of the gearbox 202, the second side 210 being opposite to the first side 206. For the purpose of the present disclosure, the functionality of the first and second gearbox guide assemblies 204, 208 may be considered similar. Construction wise, the first gearbox guide assembly 204 includes additional support plates 212 (see FIG. 3) to provide support to hydraulic lines and hoses associated with the gearbox 202. However, the remaining portion of the description in this section in relation to the first gearbox guide assembly 200 is equally applicable to the second gearbox guide assembly 200.

Figure 4:
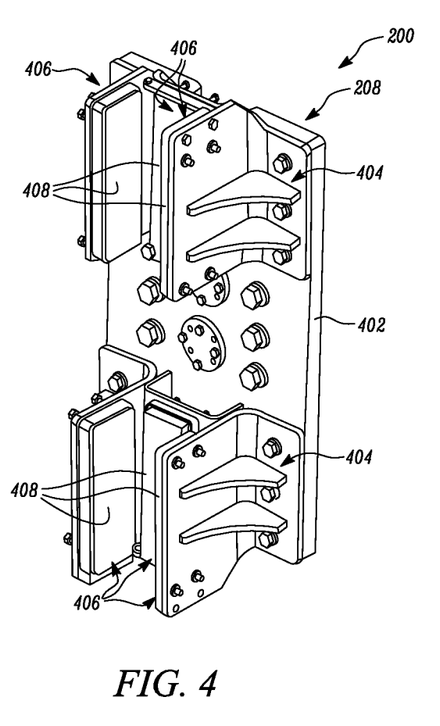
FIG. 4 is a perspective view of another gearbox guide assembly, according to various concepts of the present disclosure.

The construction of the first and second gearbox guide assemblies 204, 208 will now be explained in detail with reference to second gearbox guide assembly 208. It should be noted that the description of the components of the second gearbox guide assembly 208 are equally applicable to the first gearbox guide assembly 204. Referring to FIG. 4, the second gearbox guide assembly 208 includes a guide plate 402. The guide plate 402 is configured to guide a movement of the gearbox 202 along the mast 106. The guide plate 402 is positioned such that the guide plate 402 is parallel to a length of the mast 106 (see FIG. 2). More particularly, the gearbox 202 may be attached to the guide plate 402 by means of mechanical fasteners, such as bolts.

Further, the second gearbox guide assembly 208 includes a support assembly 404 attached to the respective guide plates 402. More particularly, the second gearbox guide assembly 208 has two support assemblies 404 positioned on each of the first and second sides 206, 210 of the gearbox 202. As can be seen, on each of the first and second sides 206, 210, the support assemblies 404 are positioned in a laterally spaced apart arrangement.

Figure 6:
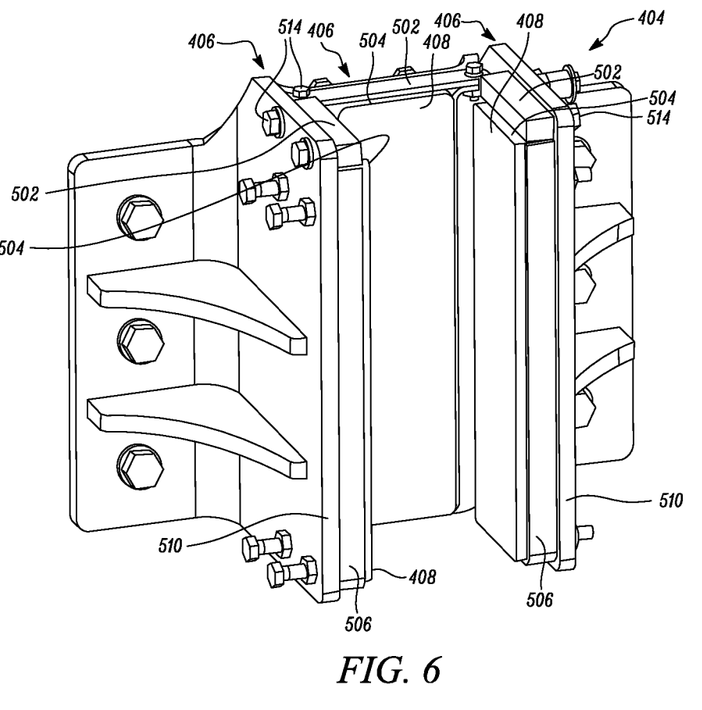
FIG. 6 is a perspective view of a portion of the gearbox guide assembly of FIG. 4, according to various concepts of the present disclosure.

All the support assemblies 404 have a similar construction, design, and functionality. Each of the support assemblies 404 includes a number of wear pad assemblies 406. For example, three wear pad assemblies 406 are provided on each of the support assemblies 404, forming a C shaped configuration for receiving the mast 106 therein. FIG. 6 depicts one of the support assemblies 404 showing the three wear pad assemblies 406 installed thereon.

Figure 5:
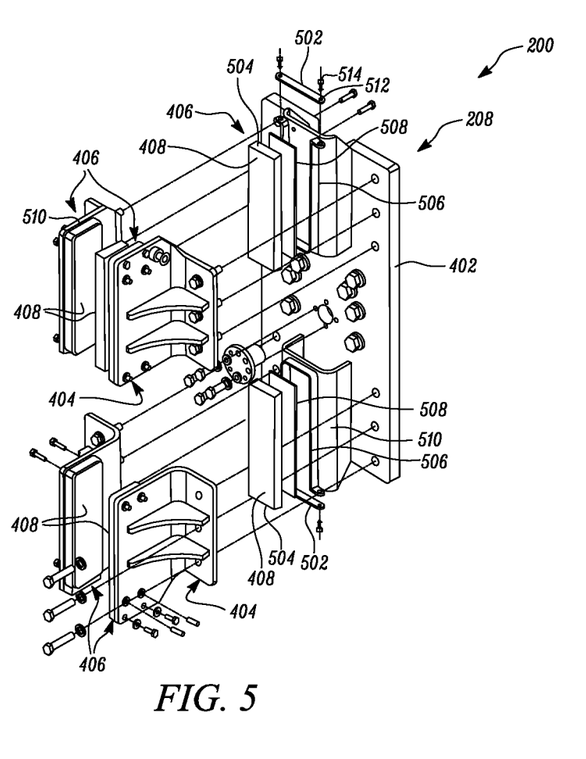
FIG. 5 is an exploded view of the gearbox guide assembly of FIG. 4, according to various concepts of the present disclosure.

The present disclosure provides the wear pad assembly 406 that may be easily dissembled to access and remove a wear pad 408 of the wear pad assembly 406 without having to disturb or remove the gearbox 202 from the gearbox guide assembly 200. Further, the wear pad assembly 406 may be easily adjusted to ensure sufficient and appropriate contact between the wear pad 408 and the mast 106 by providing a means to adjusting the wear pad 408 independent of the gearbox 202. Referring to FIGS. 4 to 6, each wear pad assembly 406 includes the wear pad 408. The wear pad 408 may be made from any suitable polymer. When installed, one surface of the wear pad 408 contacts the mast 106 (see FIG. 7).

The wear pad assembly 406 also includes a key element 502 (see FIG. 5) associated with each of the wear pads 408. The key element 502 is provided along one edge 504 of the wear pad 408. Further, a frame 506 is provided surrounding remaining edges of the wear pad 408. When installed, the frame 506 and the key element 502 completely surround the wear pad 408. As can be seen in FIG. 5, a width of the key element 502 and a width of the frame 506 corresponds to a thickness of the wear pad 408, such that the widths of the key element 502 and the frame 506 respectively are lesser than the thickness of the wear pad 408.

Further, a support plate 508 is provided in contact with a surface of the wear pad 408 that is opposite to the surface which contacts the mast 106. A length of the support plate 508 corresponds to a length of the wear pad 408 such that the length of the support plate 508 is approximately equal to the length of the wear pad. The support plate 508 is relatively thin, having a continuous and generally flat configuration. Dimensions of the support plate 508 are such that the support plate 508 is positioned and secured on the surface of the wear pad 408 lying opposite to the surface in contact with the mast 106. When installed, the support plate 508 and a portion of the thickness of the wear pad 408 are concealed by the key element 502 and the frame 506 (see FIG. 7). More particularly, the wear pad 408 is secured in position within boundaries formed by the frame 506 and the key element 502, and is sandwiched between the mast 106 on one surface, and the support plate 508 and a back plate 510 on the opposing surface.

The wear pad assembly 406 also includes the back plate 510. The back plate 510 is fixedly attached to the guide plate 402 of the gearbox guide assembly 200. The frame 506 may be fixedly coupled to the back plate 510. The back plate 510 includes a number of apertures (not shown) defined thereon for receiving mechanical fasteners therethrough. The shape and structure of the back plate 510 may vary in design. For example, the back plate 510 provided in relation with the central wear pad 408 may have a different shape than that of the back plate 510 used in relation with the side wear pads 408 of the wear pad assembly 406. However, the functionality of both back plates 510 remains same and hence the term "back plate" used in this description collectively refers these back plates 510.

Figure 7:
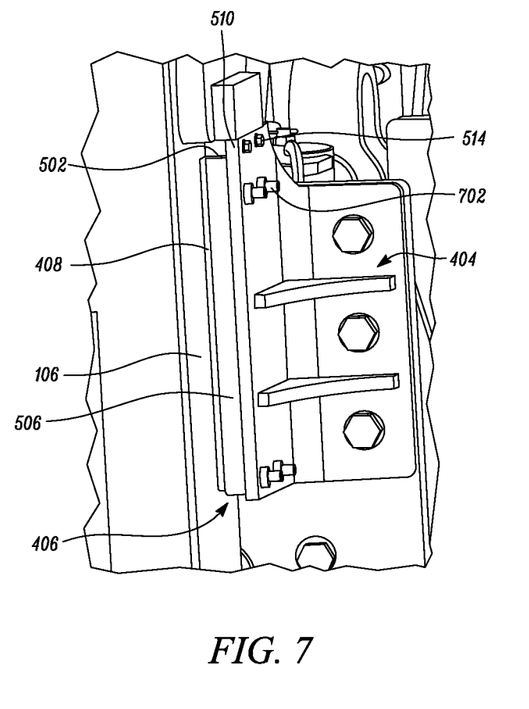
FIG. 7 is a side view of a wear pad of the gearbox guide assembly in contact with the mast, according to various concepts of the present disclosure.

Referring to FIGS. 5 to 7, the key element 502 includes a number of apertures 512 defined thereon for receiving mechanical fasteners 514, such as bolts, therethrough. The mechanical fasteners 514 removably couple the key element 502 with the frame 506 or the back plate 510. The key element 502 is removably attachable such that on removing the mechanical fasteners 514 associated with the key element 502, the key element 502 may be disassembled from the gearbox guide assembly 200, exposing the respective edge 504 of the wear pad 408 that was concealed by the given key element 502. The wear pad 408 may then be easily accessed for removal and/or replacement thereof using fingers or any other suitable instrument for pulling the wear pad 408 out of the frame 506.

Referring to FIG. 7, the mechanical fasteners 702 of the back plate 510 may be adjusted to control a movement of the wear pad 408 towards the mast 106. For example, by tightening the mechanical fasteners 702, the wear pad 408 may be made to move closer towards the mast 106. Whereas, in another example, by loosening the mechanical fasteners 702, the wear pad 408 may move away from the mast 106. The support plate 508 (see FIG. 5) provided in contact with the wear pad 408 is positioned within the frame 506 such that the wear pad 408 is protected and prevented from coming in direct contact with the mechanical fasteners 702, thereby preventing the wear pad 408 from being damaged during the adjustment of the mechanical fasteners 702.

The key element 502, frame 506, support plate 508, back plate 510, and guide plate 402 may be made from any suitable metal. Also, the shape and dimensions of these components may vary based on the application.

INDUSTRIAL APPLICABILITY

The present disclosure provides a cost effective and simple bolt-on solution allowing easy removal or replacement of the wear pads 408, as well as adjustability of the wear pads 408 relative to the mast 106. The gearbox guide assembly 200 provides a system by which the wear pads 408 may be accessed and adjusted independent of the gearbox 202 and the guide plates 402, allowing the wear pads 408 to be accessed and adjusted without requiring removal of the gearbox 202. This provides a time saving and effective method for removal or replacement of the wear pads 408 and maintains desired contact between the wear pad 408 and the mast 106.

The gearbox guide assembly 200 allows controlling a gap between the wear pad 408 and the mast 106, reducing play between the wear pads 408 and the mast 106 that may occur based on wearing of the wear pads 408 during operation. This in turn may additionally allow for alignment of the gearbox 202 with respect to a center of a drill point associated with the mast 106. More specifically, by adjusting the contact between the wear pad 408 and the mast 106, a center of a spindle of the gearbox 202 may be aligned with the center of the drill point to a relatively high degree.

The design of the gearbox guide assembly 200 is such that the mechanical fasteners for attaching the gearbox 202 to the guide plate 402 are exposed and can be easily accessed. For servicing the gearbox 202, the gearbox 202 may be removed without having to remove the guide plates 402. Also, the mechanical fasteners associated with the support assembly 404 are exposed and can be accessed independently, allowing replacement of any of the front or rear wear pads 404 without having to remove the entire gearbox guide assembly 200.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A gearbox guide assembly comprising:
   a guide assembly including a guide plate, the guide assembly being configured to guide a movement of a gearbox along a mast of a machine; and
   a support assembly associated with the guide assembly, the support assembly being configured to couple to the mast, wherein the support assembly is removably attachable to the guide assembly through mechanical fasteners, the support assembly including a plurality of wear pad assemblies attached to the support assembly,
   wherein each wear pad assembly of the plurality of wear pad assemblies includes:
      a wear pad configured to contact the mast; and
      a key element removably coupled to a corresponding wear pad assembly of the plurality of wear pad assemblies by mechanical fasteners,
   the wear pad including a front surface, a back surface disposed opposite the front surface, and an outer peripheral surface extending between the front surface and the back surface, the outer peripheral surface defining an exterior surface of the wear pad, the back surface of the wear pad facing the corresponding wear pad assembly, the front surface of the wear pad being disposed to contact the mast,
   wherein the key element directly faces the outer peripheral surface of the wear pad, such that the wear pad is accessible for removal by decoupling the key element associated therewith.

2. The gearbox guide assembly of claim 1, further comprising a support plate disposed on the back surface of the wear pad.

3. The gearbox guide assembly of claim 2, wherein a length of the support plate corresponds to a length of the wear pad.

4. The gearbox guide assembly of claim 2, further comprising a back plate contacting the support plate, the back plate defining a plurality of apertures for receiving mechanical fasteners therethrough,
   wherein the support plate is configured to prevent direct contact between the mechanical fasteners of the back plate and the wear pad, and
   wherein a movement of the wear pad toward the mast is adjustable by adjusting the mechanical fasteners associated with the back plate.

5. The gearbox guide assembly of claim 1, wherein the key element directly faces a first portion of the outer peripheral surface of the wear pad,
   the support assembly further comprising a frame surrounding and facing a second portion of the outer peripheral surface of the wear pad, the second portion of the outer peripheral surface being distinct from the first portion of the outer peripheral surface.

6. The gearbox guide assembly of claim 5, wherein the key element defines a plurality of holes therethrough for receiving mechanical fasteners therethrough to couple the key element to the corresponding wear pad assembly.

7. The gearbox guide assembly of claim 5, wherein the outer peripheral surface of the wear pad includes a first peripheral surface, a second peripheral surface disposed opposite the first peripheral surface, a third peripheral surface extending between the first peripheral surface and the second peripheral surface, and a fourth peripheral surface disposed opposite the third peripheral surface, the first portion of the outer peripheral surface is the first peripheral surface,
the second portion of the outer peripheral surface includes the second peripheral surface, the third peripheral surface, and the fourth peripheral surface.

8. The gearbox guide assembly of claim 1, wherein a width of the key element corresponds to a thickness of the wear pad.

9. The gearbox guide assembly of claim 1, wherein the plurality of wear pad assemblies includes a first group of three wear pad assemblies disposed at a first side of the support assembly and a second group of three wear pad assemblies provided at a second side of the support assembly, each of the first group of three wear pad assemblies and the second group of three wear pad assemblies forming a C-shaped configuration for receiving the mast therethrough.

10. A gearbox guide assembly comprising:
a guide assembly including a guide plate, the guide assembly being configured to guide a movement of a gearbox along a mast of a machine; and
a support assembly associated with the guide assembly, the support assembly being configured to couple to the mast, wherein the support assembly is removably attachable to the guide assembly through mechanical fasteners, the support assembly including a plurality of wear pad assemblies attached to the support assembly,
wherein each wear pad assembly of the plurality of wear pad assemblies includes:
a wear pad configured to contact the mast;
a support plate provided on an opposite side of the wear pad contacting the mast;
a back plate contacting the support plate, the back plate defining a plurality of apertures for receiving mechanical fasteners therethrough;
a key element removably coupled along one edge of the wear pad by mechanical fasteners, wherein the wear pad is accessible for removal by decoupling the key element associated therewith; and
a frame provided on remaining edges of the wear pad, the frame being configured to surround the wear pad,
wherein the support plate is configured to prevent direct contact between the mechanical fasteners of the back plate and the wear pad, and wherein a movement of the wear pad toward the mast is configured to be controlled by adjusting the mechanical fasteners associated with the back plate.

11. The gearbox guide assembly of claim 10, wherein a length of the support plate corresponds to a length of the wear pad.

12. The gearbox guide assembly of claim 10, wherein the key element defines a plurality of holes therethrough for receiving mechanical fasteners therethrough to couple the key element to a corresponding wear pad assembly.

13. The gearbox guide assembly of claim 10, wherein a width of the key element corresponds to a thickness of the wear pad.

14. The gearbox guide assembly of claim 10, wherein the plurality of wear pad assemblies includes a first group of three wear pad assemblies provided at a first side of the support assembly and a second group of three wear pad assemblies provided at a second side of the support assembly, each of the first group of three wear pad assemblies and the second group of three wear pad assemblies forming a C-shaped configuration for receiving the mast therethrough.

15. A machine including:
an engine;
a gearbox;
a mast; and
a gearbox guide assembly for the gearbox, the gearbox guide assembly including:
a guide assembly including a guide plate, the guide assembly guiding a movement of the gearbox along the mast; and
a support assembly associated with the guide assembly, the support assembly being coupled to the mast, wherein the support assembly is removably attachable to the guide assembly through mechanical fasteners, the support assembly including a plurality of wear pad assemblies attached to the support assembly,
wherein each wear pad assembly of the plurality of wear pad assemblies includes:
a wear pad configured to contact the mast; and
a key element removably coupled to a corresponding wear pad assembly of the plurality of wear pad assemblies by mechanical fasteners,
the wear pad including a front surface, a back surface disposed opposite the front surface, and an outer peripheral surface extending between the front surface and the back surface, the outer peripheral surface defining an exterior surface of the wear pad, the back surface of the wear pad facing the corresponding wear pad assembly, the front surface of the wear pad being disposed to contact the mast,
wherein the key element directly faces the outer peripheral surface of the wear pad, such that the wear pad is accessible for removal by decoupling the key element associated therewith.

16. The machine of claim 15, further comprising a support plate disposed on the back surface of the wear pad.

17. The machine of claim 16, further comprising a back plate contacting the support plate, the back plate defining a plurality of apertures for receiving mechanical fasteners therethrough,
wherein the support plate is configured to prevent direct contact between the mechanical fasteners of the back plate and the wear pad, and
wherein a movement of the wear pad toward the mast is adjustable by adjusting the mechanical fasteners associated with the back plate.

18. The machine of claim 15, wherein a width of the key element corresponds to a thickness of the wear pad.

19. The machine of claim 15, wherein the plurality of wear pad assemblies includes a first group of three wear pad assemblies provided at a first side of the support assembly and a second group of three wear pad assemblies provided at a second side of the support assembly, each of the first group of three wear pad assemblies and the second group of three wear pad assemblies forming a C-shaped configuration for receiving the mast therethrough.

* * * * *